April 30, 1946.    W. J. POLYDOROFF    2,399,382
DIRECTIONAL ANTENNA SYSTEM
Filed June 14, 1943
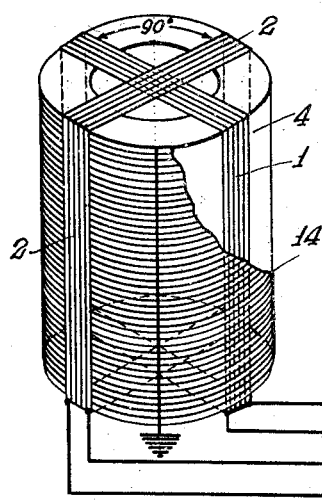
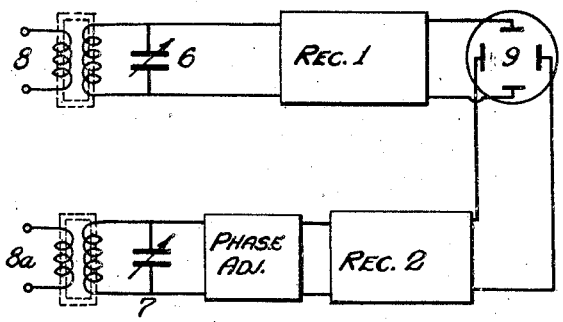
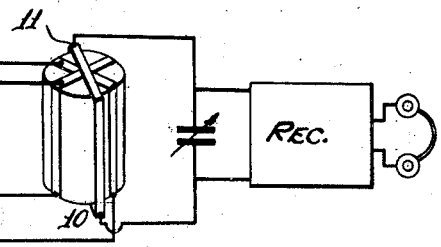
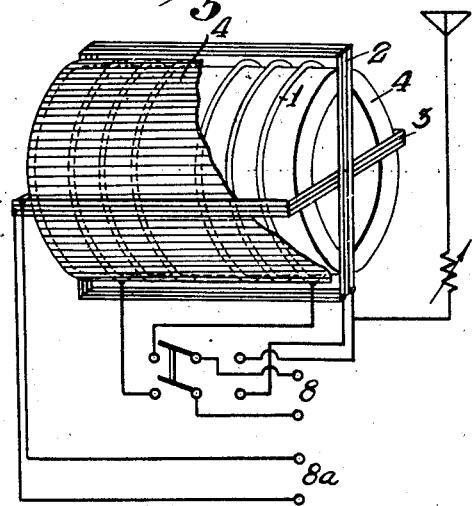
Inventor:
Wladimir J. Polydoroff Patented Apr. 30, 1946

2,399,382

UNITED STATES PATENT OFFICE 2,399,382

DIRECTIONAL ANTENNA SYSTEM

Wladimir J. Polydoroff, Chicago, Ill.

Application June 14, 1943, Serial No. 490,941

9 Claims. (Cl. 250—33)

The invention relates to ferro-magnetic loop antenna and is a continuation in part of U. S. Patent No. 2,339,234.

A part of the above application is directed to employment of crossed loops and also shows an apparatus particularly applicable to the reception of electromagnetic waves in such instances when crossed loops can be employed to advantage.

The above patent as well as U. S. Patent No. 2,266,262 describes the advantages derived from the use of ferro-magnetic loop antenna, viz., increase of pickup by said antenna because of the presence of magnetic substances, improvement in directivity when such loops are used for radio compass work, relative ease of shielding of such antenna, and general reduction in size of the installation which makes it particularly adaptable for aircraft and marine navigational purposes.

This invention will be better understood if reference is made to the accompanying drawing in which Fig. 1 shows one construction of loop antennas placed at right angles on a common ferro-magnetic core Figs. 2 and 2a show arrangement of the circuits adaptable to a construction of Fig. 1 and Fig. 3 showing other modification of invention also having plurality of loops at right angle on a common core.

Referring now to Fig. 1, two loops, 1 and 2 are shown, each wound around the cylinder 4 and placed at right angles to each other. The cylinder 4 is made of ferro-magnetic powdered material and composed of several toroidal rings assembled together to form a cylinder.

Both loops may be of aperiodic (low impedance type) and coupled individually to circuits 6 and 7 of Fig. 2 through conventional closed type transformers 8. In this case, the circuits are connected to the input of separate receivers and the output of each loop is compared by means of a suitable indicating meter or by a cathode ray oscilloscope 9.

In some cases it may be found convenient to compare two signals while they are brought in phase. Either of the receivers may be preceded or succeeded by an adjustable network to correct the phase of one of the signals before their outputs are compared or combined in the oscilloscope. The utility of such an arrangement will be discussed later.

The loop construction of Fig. 1 may be advantageously applied to the Bellini-Tosi system where two loops are fixed in position at right angles such as shown in Fig. 1 and the output of each loop is fed into a goniometer 10 of Fig. 2a having likewise two fixed windings at right angles to each other, each winding being connected to a corresponding loop coil of Fig. 1 and a movable search coil 11, the rotation of which indicates the direction of a transmitter.

In this construction if the loops are of low impedance type the search coil may be a part of a tunable circuit which circuit is connected to a suitable receiver. The rotation of the coil produces maximum and minimum signals in the receiver and it is usual to determine the position of a transmitting station by a minimum or null method by the rotation of search coil which may be supplied with an azimuth indicator. Great care should be taken that two windings are placed in non-inductive relation for which purpose one of the windings can be adjusted separately until no reaction exists between the windings. To avoid any capacitive coupling between the two windings each loop coil bay be independently shielded as shown by an electrostatic shield 14 and the connection from each winding to the radio goniometer made through separate shielded cable.

Fig. 3 shows another application of the invention whereby a loop winding 1 of the type described in U. S. Patent No. 2,266,262 is used for directional purposes and is wound in the form of a solenoid around a cylinder core 4.

Around the periphery of the cylinder another loop 2 is wound so that its axis is perpendicular to the first loop.

In many instances of direction finding the loop is made rotatable to observe the zero reading after which in order to determine the sense of the direction the loop is turned 90 degrees from its zero setting, at which latter position a vertical antenna is applied (90 degrees out of phase) so as to produce well known cardioid pattern by which the "sense" of the direction is found. To avoid this unnecessary delay in taking of two bearings, the second loop is switched in lieu of the first loop, and its usual "figure 8" pattern is transformed into a cardioid by an addition of a vertical antenna to get a "sense" of the station. Thus by a simple selection of either loop and an addition of a vertical antenna the direction and sense are found at the same position of a rotatable assembly.

It is evident that for successful operation of such system both loops should be of the same inductance and while first loop should be shielded for a clean zero indication as shown by the screen 14 of Fig. 3 the second loop may be wound over the shield of the first loop, if the shield of the first loop is of the type known as Faraday screen and made of a wire cloth in which all the shielding wires run in one direction without completing the loops.

While this shielding arrangement somewhat diminishes the "night effect" the evaluation of such abnormal polarization may be further observed and determined by a third loop 3 as shown on Fig. 3, said third loop being constructed similar to loop 2 but wound horizontally around the periphery of the cylinder 4 of the same inductance and pickup properties as loop 2. Thus loop windings 1, 2, 3 are mutually at right angles and wound on a common magnetic core. Loop 1 acts as directional finding loop and when zero position is determined loops 2 and 3 are simultaneously switched on. Loop 2 is connected to receiver 1 of Fig. 2 and the loop 3 to receiver 2 of the same figure through a phase adjusting device. The outputs of both receivers are brought respectively to vertical and horizontal set of plates of oscilloscope 9. In the absence of "night effect" receiver 1 will produce an indication of the signal by a horizontal line the level of which represents signal strength. In the presence of night effect loop 3 will also pick a signal which will be manifested by an additional deflection of cathode ray so that a combined output of the receivers will produce a well-known Lissajous pattern of an ellipse whose major axis is inclined. If the second output is adjusted by means of a phase adjusting network to correspond to the phase of the first signal, the ellipse will disappear and the output of two signals will form a straight line inclined from the horizontal. The appearance of an ellipse already indicates the presence of a night effect and further transformation of the figure into a line will enable an operator to judge the amount of error of first directional bearing which was due to a night effect. An experimental calibration of the inclination of the line may establish the degree of deviation from the true direction of a transmitter caused by the horizontal polarization of the wave. If the signal strength of both components are known, for instance by measuring, the deviation may be calculated and the original reading obtained by loop 1 corrected.

Thus the present invention describes the novel ways of utilizing several loop coils around a common magnetic mass and new methods of applying such loops for directional purposes.

In the above described figures ferro-magnetic cores are shown in the shape of hollow cylinders but the invention is not limited to such shapes as it can be advantageously applied to any other shapes of cores, for instance, rectangular, spherical or any other symmetrical body of rotation, on which several loops may be placed mutually at right angles.

The arrangement shown on Fig. 3 is particularly useful for "homing" system such as may be used in an aircraft and in which the loop is generally placed in a fixed position so that its zero direction corresponds to the course of the ship and the receiver of the system is provided with "right-left indicator," showing when aircraft's course is in the direction of the station.

In such system the reception of communications from that home station when the aircraft is headed on the station may be accomplished by another loop, which in accordance with Fig. 3 is placed at right angle to the homing loop and designated as 2 of this figure.

I claim:

1. An antenna system for the reception of electromagnetic radiations comprising plurality of coil antennas, placed mutually at right angles to each other, a common cylindrical ferro-magnetic core in the field of said coils, one of said coils circumferentially wound in the form of a helix having a common axis with said core.

2. An antenna system for the reception of electromagnetic radiations comprising plurality of coil antennas, placed mutually at right angles to each other, a common cylindrical ferro-magnetic core in the field of said coils, composed of finely divided insulated magnetic particles, one of said coils circumferentially wound in the form of a helix having a common axis with said core.

3. An antenna system for the reception of electromagnetic radiations comprising plurality of coil antennas mutually at right angles to each other, a common ferro-magnetic core in the field of said coils, said core having a uniform rounded cross section along its axis, one of said coils circumferentially wound around said core in the form of a helix, having a common axis with said core.

4. An antenna system for the reception of electromagnetic radiations comprising plurality of coil antennas, placed mutually at right angles to each other, a common cylindrical ferro-magnetic core in the field of said coils, one of said coils circumferentially wound in the form of the helix having a common axis with said core, another one of said coils being wound spacedly from said core in a vertical plane around its perimeter.

5. An antenna system for the reception of electromagnetic radiations comprising a plurality of coil antennas, placed mutually at right angles to each other, a common cylindrical ferro-magnetic core in the field of said coils, one of said coils circumferentially wound in the form of a helix, having a common axis with said core, another one of said coils being wound spacedly from said core in a vertical plane around its perimeter, and an electrostatic screen interposed between said coils.

6. An antenna system for the reception of electromagnetic radiations comprising plurality of coil antennas, placed mutually at right angles to each other, a common cylindrical ferro-magnetic core in the field of said coils, one of said coils circumferentially wound in the form of a helix having common axis with said core, a second coil being wound spacedly from said core in a vertical plane around its perimeter, said first and said second coils having substantially equal inductance and pickup properties.

7. An antenna system for the reception of electromagnetic radiations comprising plurality of coil antennas, placed mutually at right angles to each other, a common cylindrical ferro-magnetic core in the field of said coils, one of said coils circumferentially wound in the form of a helix, having a common axis with said core, another second coil being wound spacedly from said core in a vertical plane around its perimeter, and an electrostatic screen interposed between said first and said second coil, said first and said second coils having substantially equal inductance and pickup properties.

8. An antenna system for the reception of electromagnetic radiations comprising plurality of coil antennas placed mutually at right angles to each other, a common cylindrical ferromagnetic core in the field of said coils, one of said coils circumferentially wound in the form of a helix, having a common axis with said core, and other two identical coils being wound spacedly from said core around its perimeters at right angle to each other.

9. An antenna system for the reception of electromagnetic radiations comprising plurality of coil antenna, placed mutually at right angles to each other, a common cylindrical ferro-magnetic core in the field of said coils, one of said coils wound in the form of a helix around the perimeter of said core in a vertical plane, another second coil being wound spacedly from said core also in a vertical plane around its perimeter, and an electrostatic shield interposed between said coils.

WLADIMIR J. POLYDOROFF.